(12) United States Patent
Ramos et al.

(10) Patent No.: US 7,986,660 B2
(45) Date of Patent: Jul. 26, 2011

(54) CHANNEL ALLOCATION FOR COMMUNICATION SYSTEM

(75) Inventors: Gabriel Ramos, Málaga (ES); Matti Salmenkaita, Málaga (ES); Fabio Longoni, Campanillas (ES); Francois D'Argence, Espoo (FI); Timo Halonen, Espoo (FI); Juan Melero, Espoo (FI); Petter Hakalin, Benamadena (ES); Antti Tolli, Torremolinos (ES); Jose Antonio Cortes, Málaga (ES); Arto Kangas, Espoo (FI); Harri Holma, Espoo (FI)

(73) Assignee: QUALCOMM Incorporated, San Diego, CA (US)

( * ) Notice: Subject to any disclaimer, the term of this patent is extended or adjusted under 35 U.S.C. 154(b) by 937 days.

(21) Appl. No.: 10/398,716

(22) PCT Filed: Oct. 9, 2001

(86) PCT No.: PCT/IB01/02219
§ 371 (c)(1),
(2), (4) Date: Sep. 23, 2003

(87) PCT Pub. No.: WO02/32173
PCT Pub. Date: Apr. 18, 2002

(65) Prior Publication Data
US 2004/0057402 A1 Mar. 25, 2004

(30) Foreign Application Priority Data

Oct. 9, 2000 (GB) .................................. 0024705.6
Nov. 10, 2000 (GB) .................................. 0027534.7
Jun. 19, 2001 (GB) .................................. 0114965.7
Jun. 20, 2001 (GB) .................................. 0115083.8

(51) Int. Cl.
*H04W 4/00* (2009.01)
*H04W 36/00* (2009.01)
*H04W 72/00* (2009.01)

(52) U.S. Cl. ........ 370/329; 370/331; 455/436; 455/437; 455/438

(58) Field of Classification Search .................. 455/450, 455/560, 432.1–453; 370/432, 321–333, 370/341, 348, 431
See application file for complete search history.

(56) References Cited

U.S. PATENT DOCUMENTS 5,034,993 A 7/1991 Sasuta et al.
(Continued)

FOREIGN PATENT DOCUMENTS

EP 0 496 061 A2 7/1992
(Continued)

OTHER PUBLICATIONS

Rozenstrauch et al, "2 Phase RF Channel Allocation", Mar. 1, 1995, Motorola Technical Developments, vol. 24, pp. 70-71.
(Continued)

*Primary Examiner* — George Eng
*Assistant Examiner* — Wesley L Kim
(74) *Attorney, Agent, or Firm* — Darren M. Simon (57) ABSTRACT

A communication system covering an area, including a plurality of first units. Each of the first units being configured to control the allocation of channels in a part of the area. At least one of the first units being configured to send information relating to channel allocation in the part of the area associated with the at least one first unit to at least one other of the first units. The at least one other of the first means units being configured to take into account the received information when controlling the allocation of channels in the part of the area associated with the at least one other first units.

39 Claims, 5 Drawing Sheets

U.S. PATENT DOCUMENTS

| | | | |
|---|---|---|---|
| 5,175,867 A * | 12/1992 | Wejke et al. | 455/439 |
| 5,509,051 A | 4/1996 | Barnett et al. | |
| 5,530,917 A | 6/1996 | Andersson et al. | |
| 5,708,975 A * | 1/1998 | Heiskari et al. | 455/63.1 |
| 5,793,763 A | 8/1998 | Mayes et al. | |
| 5,828,963 A | 10/1998 | Grandhi et al. | |
| 5,909,051 A | 6/1999 | Stockman et al. | |
| 6,055,236 A | 4/2000 | Nessett et al. | |
| 6,058,431 A | 5/2000 | Srisuresh et al. | |
| 6,078,817 A | 6/2000 | Rahman | |
| 6,128,664 A | 10/2000 | Yanagidate et al. | |
| 6,278,701 B1 | 8/2001 | Ayyagari et al. | |
| 6,301,478 B1 * | 10/2001 | Wallstedt et al. | 455/436 |
| 6,434,396 B1 * | 8/2002 | Rune | 455/502 |
| 6,490,452 B1 * | 12/2002 | Boscovic et al. | 455/436 |
| 6,574,475 B1 * | 6/2003 | Suzuki | 455/438 |
| 6,690,939 B1 * | 2/2004 | Jonsson et al. | 455/453 |
| 6,771,964 B1 * | 8/2004 | Einola et al. | 455/437 |
| 6,792,284 B1 | 9/2004 | Dalsgaard et al. | |
| 2001/0053695 A1 * | 12/2001 | Wallentin | 455/436 |
| 2002/0176382 A1 * | 11/2002 | Madour et al. | 370/331 |
| 2003/0076803 A1 * | 4/2003 | Chuah | 370/338 |

FOREIGN PATENT DOCUMENTS

| | | |
|---|---|---|
| JP | 09307939 | 11/1997 |
| JP | 11275623 | 10/1999 |
| JP | 2000278735 A | 10/2000 |
| WO | WO9606512 | 2/1996 |
| WO | WO9859513 | 12/1998 |
| WO | WO9908407 | 2/1999 |
| WO | WO 01/35692 A1 | 5/2001 |

OTHER PUBLICATIONS

Mende et al, "Mobile Radio Network Management Supported by a Planning Tool", IEEE Network Operations and Management Symposium, IEEE, vol. Conf. 10, pp. 483-492. 1998.

Inoue et al, "Performance Analysis of Microcellular Mobile Communication Systems", Vehicular Technology Conference, 1994, IEEE 44$^{th}$ Stockholm, Sweden, Jun. 8-10, 1994, pp. 135-139.

International Search Report—PCT/IB01/002219, International Search Authority—European Patent Office, Feb. 25, 2002.

International Preliminary Examination Report—PCT/IB01/002219, International Search Authority—European Patent Office, Jan. 24, 2003.

International Search Report-PCT/US2001/016512, International Search Authority-European Patent Office, Sep. 05, 2001 (090485WO).

Nevdyaev, L.M., "3rd Generation Mobile Communication," Communications and Business, 2000, pp. 121 and 154.

* cited by examiner

CHANNEL ALLOCATION FOR COMMUNICATION SYSTEM

FIELD OF THE INVENTION

The present invention relates to the allocation of channels to users in a communication system, and particularly but not exclusively to the allocation of channels in a mobile communication system.

BACKGROUND OF THE INVENTION

In a typical cellular wireless network, the area covered by the network is divided into a number of cells. Each cell is served by a base transceiver station which transmits signals to and receives signals from terminals located in the respective cell associated with a particular base transceiver station. The terminals may be mobile stations, which are able to move between cells.

Channel allocation involves the allocation of a channel to a particular connection. There is usually an up link channel from the mobile station to the base station and a down link channel from the base station to the mobile station. The channels can be defined by different frequencies, time slots and/or spreading codes. Channel allocation can for some types of call such as data calls also require the selection of the allocation period. In WCDMA the allocation period is the period in the radio network controller that the packet scheduler can change bit rates for packet users. Channel allocation is done in a distributed way in the current networks. In particular, it is the responsibility of the controller of a base station to control the resources of its own base stations. In the GSM (Global System for Mobile Communications) standard, a base station controller (BSC) is arranged to control channel allocation for a set of base stations.

In the proposed third generation system using CDMA (Code Division Multiple Access), a radio network controller (RNC) is arranged to control the channel allocation for its own base stations. In the CDMA system, the base station is sometimes referred to as Node B. However in this document the term base station will be used. The controllers in both the GSM and CDMA systems are arranged to control a number of base stations. However the number of base stations which are controlled are relatively small. Accordingly, with this approach the efficiency of any channel allocation is limited in that the co-ordination of the channel allocation is possible only within the controller's own limited area. This means that it is not possible to co-ordinate channel allocation between cells that are controlled by different controllers. This in turn means that implementation of features that are intended to limit the interference between channels in adjacent or nearby cells cannot be achieved as the cells may be controlled by different controllers.

The problems described previously will become more relevant in the future. In some of the newly designed network architectures, such as IP based radio access networks, the channel allocation functions are moved from the controllers, such as the radio network controller and the base station controller, to the base station itself. This is in order to allow the implementation of a more efficient real time (RT) allocation of a channel. However, this removes even the possibility of co-ordinating the allocation of channels by base stations controlled by the same controller.

The limitations of the radio controller boundaries also have particular relevance when a network operator owns more than one radio access system (for example a CDMA system and a GSM system) with a common coverage area. This is because it is not possible to co-ordinate the allocation of channels in the different systems to reduce interference. In addition to third generation systems such as CDMA, other systems such as Wireless LAN (local area network), IS-41 (a US version of CDMA), etc are being developed.

SUMMARY OF THE INVENTION

It is an aim of embodiments of the present invention to address one or more of the above mentioned problems.

According to a first aspect of the present invention there is provided a communication system covering an area, said system comprising a plurality of first means, each of said first means being arranged to control the allocation of channels in a part of said area, at least one of said first means being arranged to send information relating to channel allocation in the part of the area associated with said at least one first means to at least one other of said first means, said at least one other of said first means being arranged to take into account said received information when controlling the allocation of channels in the part of the area associated with said at least one other first means.

The at least one first means may be arranged to send channel allocation information to said at least other first means which is associated with a part of said area adjacent to or at least partially overlapping the part of the area associated with said at least one first means.

The at least one first means may be arranged to send power control information to said at least other first means which is associated with a part of said area adjacent to or at least partially overlapping the part of the area associated with said at least one first means.

Said at least one first means may have forwarding information which indicates to which one or more other first means the channel allocation information is to be sent.

Said channel allocation information may comprise cell information and/or information about channel allocation. Cell information may include LAC, CI (information to identify the cell). Channel allocation information may include state of time slots (idle/reserved/half rate or full rate), used DL power control of base station, used MAIO=mobile allocation index offset]

Said at least one first means may be arranged to continuously send said channel allocation information to said at least one other first means.

Said at least one first means may be arranged to send said channel allocation information when there is a change in said channel allocation information to the at least one other first means.

Said at least one first means may be arranged to send said channel allocation information in response to a request from one of said at least one other first means.

Said at least one first means may be provided with information identifying the at least one other first means to which said information is to be sent.

Co-ordinating means may be provided which receive said channel allocation information from said at least one first means.

Said coordinating means may be arranged to forward said channel allocation information to said at least one other first means.

Said co-ordinating means may be provided with forwarding information which defines to which at least one other first means the channel allocation information from said at least one first means is to be forwarded, Said coordinating means may be arranged to make channel allocation decisions for at least one other first means taking into account the channel allocation information from said at least one first means.

Said coordinating means may be provided in a network element separate to the other means.

At least one of the following methods may be used by said first means to allocate a channel: dynamic frequency allocation; dynamic channel allocation; and co-ordination of the use of high data rates.

A plurality of radio access networks may be provided, at least one of said first means being associated with one of said radio access networks and at least one of said first means being associated with another of said radio access networks.

In a further aspect the present invention provides a coordinating means for receiving channel allocation information from at least one first means in a communication system, the communication system covering an area, and said system comprising a plurality of said first means, each of said first means being arranged to control the allocation of channels in a part of said area, at least one of said first means being arranged to send information relating to channel allocation in the part of the area associated with said at least one first means to at least one other of said first means, said at least one other of said first means being arranged to take into account said received information when controlling the allocation of channels in the part of the area associated with said at least one other first means.

BRIEF DESCRIPTION OF THE DRAWINGS

For a better understanding of the present invention and as to how the same may be carried into effect, reference will now be made by way of example only to the accompanying drawings in which.

DESCRIPTION OF PREFERRED EMBODIMENTS OF THE PRESENT INVENTION

Figure 1:
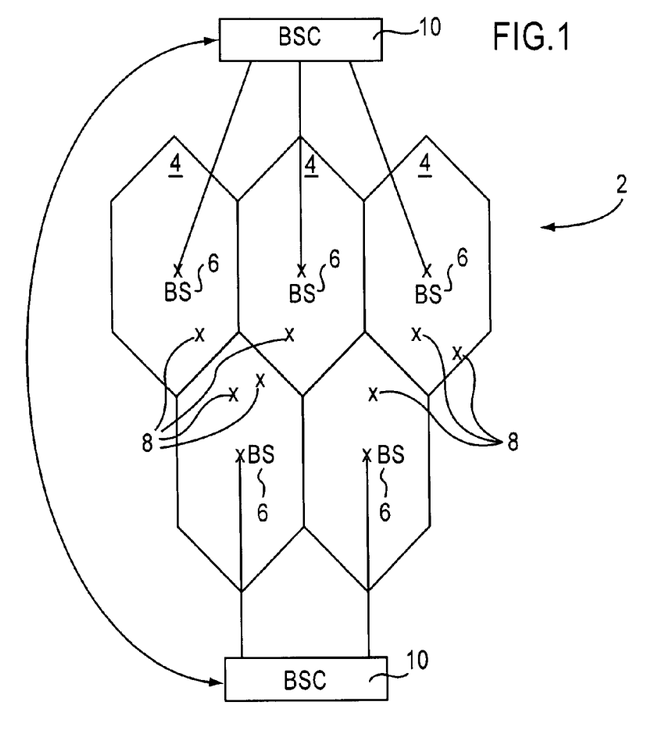
FIG. 1 shows a first embodiment of the present invention with a single radio access network.

Reference is first made to FIG. 1 which shows a first embodiment of the present invention in which a single radio access network 2 is present. In the embodiment shown in FIG. 1, the network 2 is a GSM network. However it should be appreciated that in alternative embodiments of the present invention, the network can be in accordance with any other standard and use any radio access technique. The area covered by the network 2 is divided into cells 4. In the embodiment shown in FIG. 1, five cells are shown. This is by way of example only and in practice a network will have very many cells. Each cell has associated therewith a base station 6. Each base station 6 is arranged to communicate with mobile stations 8 in the cell 4 associated with the respective base station 6. Depending on the standard used, a mobile station may be in communication with more than one base station at the same time. Alternatively or additionally a mobile station may communicate with a base station associated with a cell different to that in which the mobile station is located. This may occur if a mobile station is close to a cell boundary.

Each base station 6 is controlled by a respective base station controller 10. In the embodiment shown in FIG. 1, one base station controller 10 is arranged to control three base stations whilst the other base station controller 10 is arranged to control two base stations. This is by way of example only and a base station controller may control only one base station or more than three base stations. The base station controllers 10 are arranged to control channel allocation. The two base station controllers 10 are connected to one another. This is so each base station controller is able to transmit information about the channel status or cell status in the cells controlled by that base station controller to the other base station controller. This is described in more detail hereinafter.

In a preferred embodiment of the invention, the base station controllers transmit channel and/or cell status information to the other base station controllers which control an area adjacent to that controlled by the transmitting base station.

Figure 2:
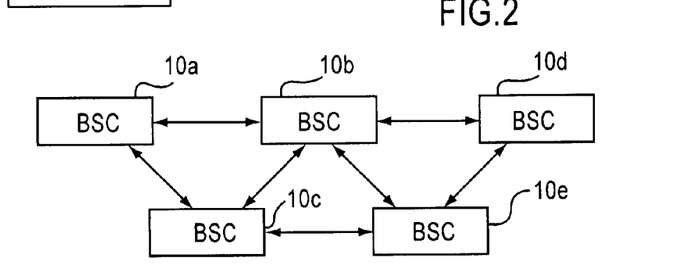
FIG. 2 shows the interconnections between base station controllers in the embodiment of FIG. 1.

Reference is made to FIG. 2 which shows five base station controllers 10. As can be seen, the first base station controller 10a is connected to the second base station controller 10b and the third base station controller 10c. The second base station controller 10b is also connected to the third, fourth and fifth base station controllers 10c, 10d and 10e. The third base station controller 10c is also connected to the fifth base station controller 10e. The fourth base station controller 10d is also connected to the fifth base station controller 10e. As can be seen, each base station controller is not connected to each of the other base station controllers. Rather, each base station controller is only connected to those base station controllers which control an area adjacent the area covered by the base station controller in question. Thus each base station controller only reports status information to those base station controllers which control an area adjacent the area covered by the base station controller in question. The adjacent area may be an immediately adjacent area or may be an area which is not immediately adjacent but close enough to cause interference. The base station controllers to which a given base station controller is connected may depend on the method of channel allocation used, may be determined by the speed at which channel allocation is required, the required reduction in interference and/or any other suitable parameter.

In a preferred embodiment, the base station controllers are not connected in a one-to-one fashion as shown in FIG. 2, but rather all the base station controllers may be connected to a local area network.

Thus in preferred embodiments of the present invention, each network element with a channel allocation entity sends channel status information to one or more neighbouring channel allocation entities, that is an entity which is responsible for the channel allocation in adjacent cells. In the context of the embodiment of FIG. 1, the channel allocation entities are the base station controllers. The sending of the information can be implemented by defining in each one of the channels allocation entities the identity of the or each neighbouring channel allocation entity which requires information from the particular channel allocation entity.

A given channel allocation entity will thus continuously send information on the cell status and/or channel status to the or each identified channel allocation entity which is responsible for the channel allocation in adjacent cells. Instead of continuously sending the information, the sending of information can be done whenever there is a change in the cell status and/or channel status or in response to a request from a given channel allocation entity.

When a channel allocation entity is making a decision relating to channel allocation, the entity will take into account the information which the entity has from, for example, the base stations which are controlled thereby, and the information received from the or each adjacent channel allocation entity.

The channel allocation entity can use any suitable criteria in order to make a decision relating to channel allocation. For example the GSM dynamic frequency channel allocation or a similar method can be used. Another example of a possible method which could be used is the TDD (time division duplexing) dynamic channel allocation or a similar method. Yet another example of a possible method is the coordination of the use of high data rate in CDMA or similar method. Another example is the Dynamic Frequency and Channel Allocation (DFCA) method.

The exact information which is sent will depend on the method which is used to allocate channels and/or the radio access network type. For example with EDGE dynamic frequency channel allocation, a channel allocation matrix may be sent. Other types of information could be multicast. For example power control information of the interfering base stations, or both up-link and down-link background interference matrix information could be multicasted. Multicast is where the same message is sent to a number of base stations.

The channel allocation entities are provided with a suitable interface which permits the entities to be connected together. Alternatively, the cell status and/or channel allocation information can be added to existing interfaces such as the Iur interface for UTRAN (UMTS terrestrial radio access network). The protocol which carries this information is preferably flexible and backwardly compatible.

Figure 3:
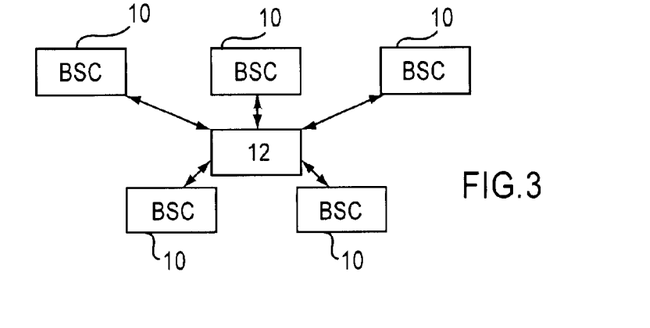
FIG. 3 shows a modification to the embodiment of FIG. 1.

Reference is now made to FIG. 3, which shows a modification to the embodiment of FIG. 1. In this embodiment, base station controllers 10 are each connected to a co-ordinating network element 12. A single coordinating network element may be provided for the entire network or a plurality of co-ordinating network elements may be provided for the network. In the latter case, a few of the base station controllers may be connected to more than one of the co-ordinating network elements. This is to ensure that for a given base station controller, a given one of the coordinating elements will have information on all of the adjacent cells which need to be taken into account when making a channel allocation decision.

If a coordinating element is provided, the co-ordinating element will make the channel allocation decisions. In order to permit the coordinating element to make the correct decision, it will have information identifying those channel allocation entities from which information is to be considered when making a decision for a particular cell. In a modification to this, the coordinating element does not itself make the decision but rather forwards the information that it receives from the various channel allocation entities to those channel allocation entities which require that information. Again the coordinating entity would have information as to which channel allocation entities the information from a given channel allocation entity is to be forwarded.

Figure 4:
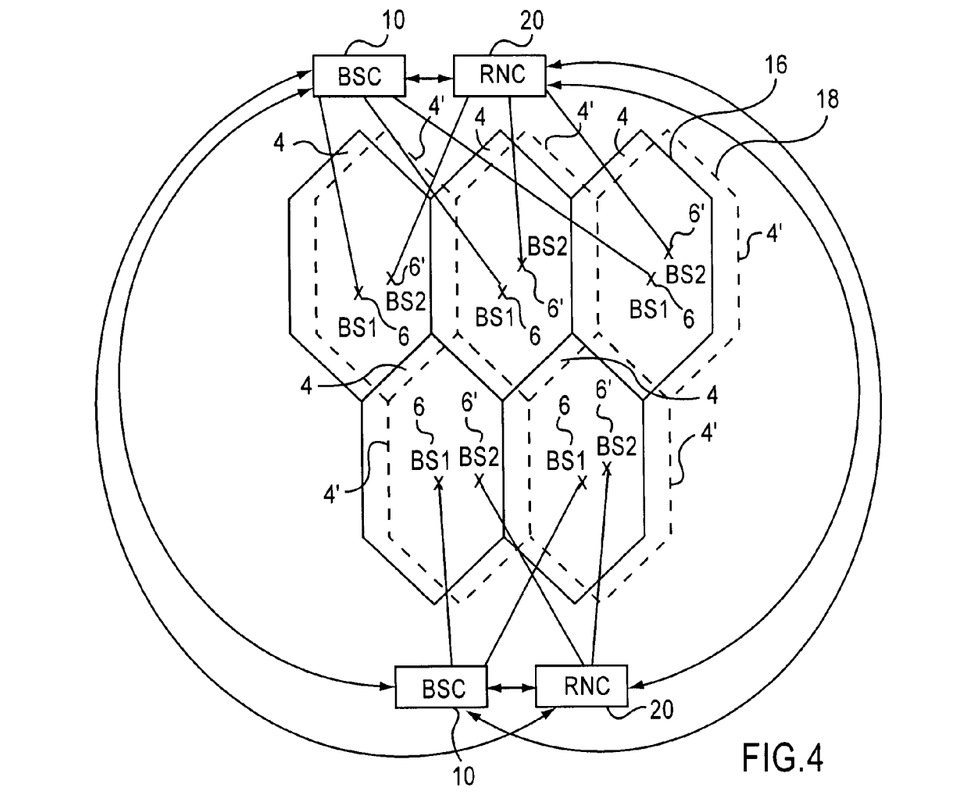
FIG. 4 shows a second embodiment of the present invention with two radio access networks.

Reference is made to FIG. 4 which shows a second embodiment of the present invention where the system 14 comprises a first radio access network 16 and a second radio access network 18. For clarity the second network is shown in dotted lines. The first radio access network 16 is a GSM network but can be any other type of radio access network. The second radio access network 18 is a CDMA network but again can be any other type of network. In some embodiments of the present invention, more than two radio access networks may be provided. The radio access networks may use the same or different standards.

The first and second networks 16 and 18 are shown in FIG. 4 as overlapping. It should be appreciated that in alternative embodiments of the present invention, the networks may only partially overlap or may be provided side by side.

The first network 18 is the same as the network shown in FIG. 1. Accordingly like parts are referred to by like references and will not be described in any further detail.

The second network 18 has its coverage area divided into a number of cells 4' as with the first network 16. Each cell is provided with its own base station 6' which is arranged to communicate with mobile stations in the cell associated with that cell and/or mobile stations located in an adjacent cell. Each base station 6' is connected to a radio network controller 20. One radio network controller 20 is connected to two base stations whilst the other is connected to three base stations. In practice, a radio network controller 20 can be connected also to just one base station or more than three base stations.

The radio network controllers 20 are connected to each other and to each of the base station controllers 10 of the first network 16. In preferred embodiments of the present invention, each controller, that is a base station controller 10 or a radio network controller 20, is connected to the or each controller which is responsible for an adjacent area. A given controller is not, in preferred embodiments of the invention connected to a controller which not responsible for an adjacent area.

The controllers then operate in a similar manner to that described in relation to FIG. 1. In this embodiment, the base station controllers and the radio network controllers are the channel allocation entities. Thus the conditions in adjacent or overlapping cells from both networks can be taken into account when making channel allocation decisions.

Figure 5:
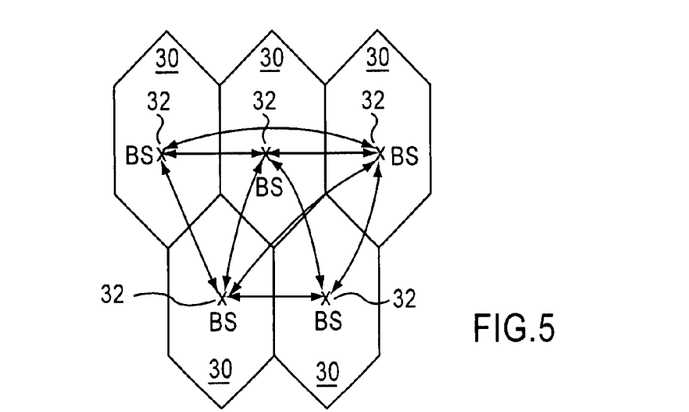
FIG. 5 shows a third embodiment of the present invention with a radio access network where channel allocation is controlled by a base station.

Reference is made to FIG. 5, which shows a third embodiment of the present invention. The network shown in FIG. 5 is an IP based radio access network. Again, the area covered by the network is divided into a plurality of cells 30. Each cell is provided with a base station 32. The base stations 32 are arranged to communicate with mobile stations in the associated cell 30 or in other cells. In the network shown in FIG. 5, the channel allocation is controlled by the base stations. Base station controllers may be provided but they are not responsible for channel allocation. The base stations are each connected to those base stations which are responsible for cells which could cause interference to the base station in question.

The base stations then control channel allocation in a similar manner to that described in relation to the first embodiment. In the embodiment shown in FIG. 5, the channel allocation entities are the base stations.

A description of an example interface arrangement for the embodiment of FIG. 3 or FIG. 5 is described hereinafter. It should be understood that the example interface given herein is for the purpose of illustrating the present invention, and the invention is not limited to this implementation of the interface.

In this example the base station (referred as CRS, cell resource server) to CRS interface is used for the transmission of base station measurements to neighboring base stations. An example base station measurement is the known channel allocation matrix for dynamic frequency and channel allocation (DFCA).

The CRS-CRS interface is used in order to exchange the information needed by the DFCA so that the main potential gains associated to a synchronized system can be achieved. All the channel allocation features that can be potentially built over synchronized GSM networks, for example, will preferably be based on the calculation of the carrier to interference (C/I) values associated to different combinations of timeslot and frequency. In order to accurately perform such calculation it is required to have access to the traffic distribution and power control information of existing connections in interfering cells. This information will permit the system to control the C/I of each connection, efficiently distributing the interference and achieving the highest spectral efficiency.

The interfering cells are allocated in both the serving cell CRS and neighbour CRSs. Therefore a mechanism to access the relevant information from neighbours CRSs must be provided.

There are two possible guidelines for the implementation of this interface.

A. Point-to-point addressing (UNICAST)
  In this case, one measurement message must be generated for each of the neighbour CRSs that must receive the message.
B. Multicast addressing (MULTICAST)
  It is possible to use multicast addressing, so that if one CRS has to send the same measurement to several neighbouring CRSs, just one message is sent to a multicast address, and the transport network shall deliver one copy of the message to all the recipients.
  The same elementary procedures can be specified for both options, but the only difference will be some of the content of the messages.

The same elementary procedures can be specified for both techniques. The only difference will be the content of the messages.

This interface shall be based on Iub [25433] and Iur [25423] common and dedicated measurement procedures.

In this preferred embodiment a new CRMS (common resource management server)-CRS interface is provided. The main function of the new CRMS-CRS interface is to transfer base station measurements to the CRMS. One of the most important measurements to be reported is the information related to the actual load on the cells managed by the CRS.

The measurements reporting procedures may be based on the Iur Common Measurement procedures [25·423]. Both of these, and also the Iuc1 interface, support on-demand (immediate), periodical or event-triggered reporting methods.

On-demand (immediate): in this case the measurements will be sent immediately, as a response to the measurement initiation request message. Periodical: the measurements are sent periodically, the period of the report is fixed in the measurement initiation request message.

Event-triggered: it is also possible to define events or threshold levels, so that the measurements are sent only when a particular event occurs (or the threshold level is reached).

The CRMS-CRS interface allows the CRMS to select and set the reporting method for one, a group or all of the elements to be measured using just procedure messages. The report of the measurements can also be done individually or grouped. Measurements can be expressed with parameters independent of the radio technology, or be sent directly to the CRMS with radio-dependent parameters, so that the application running on the CRMS can convert them.

The baseline for a further standardisation is assumed to be the standard procedures of the Iub/Iur interfaces. Based on this assumption, four elementary procedures are preferably defined for this interface: measurement initiation; measurement report; measurement termination; and measurement failure.

The measurement reporting procedures are based on the UTRAN Iur Common Measurement procedures [25423]. These procedures, and also the ones defined for this interface, will support on-demand (immediate), periodic or event-triggered reporting methods.

The CRMS shall select and set the reporting method for one, a group or all of the elements to be measured using just one message. The reporting of the measurements can also be done individually or grouped.

Measurements can be expressed with parameters independent of the radio technology, or just be sent directly to the CRMS with radio-dependent parameters, so that the application running on the CRMS should convert them. One other or both of these options can be used.

Four elementary procedures are defined for this purpose:

| Elementary Procedure | Initiating Message | Successful Outcome Response message | Unsuccessful Outcome Response message | Time r |
|---|---|---|---|---|
| Measurement Initiation | MEASUREMENT INITIATION REQUEST | MEASUREMENT INITIATION RESPONSE | MEASUREMENT INITIATION FAILURE | |
| Measurement Reporting | MEASUREMENT REPORT | | | |
| Measurement Termination | MEASUREMENT TERMINATION REQUEST | | | |
| Measurement Failure | MEASUREMENT FAILURE INDICATION | | | |

Figure 6A:
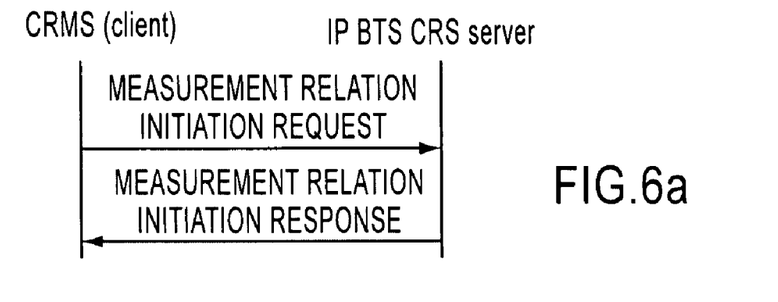
FIGS. 6(a) to 6(g) illustrate communication in an example interface.

In the measurement initiation illustrated in FIG. 6a, the client (i.e, CRMS) sends a MEASUREMENT INITIATION REQUEST message to the IP BTS (CRS) (server). This message defines which object(s) will be measured, and the reporting characteristics, which are:

On-demand (immediate): in this case the measurements will be sent immediately, as a response to the MEASUREMENT INITIATION REQUEST message.

Periodical: the measurements are sent periodically, the period of the report is fixed in the MEASUREMENT INITIATION REQUEST message.

Event-triggered: it is also possible to define some kind of events or threshold levels, so that the measurements are sent only when this event occurs (or the threshold level is reached).

If the operation is successful, the IP BTS (CRS) (server) sends a MEASUREMENT INITIATION RESPONSE message, which may include the measurement if the on-demand option has been set up. On the other hand, if the operation is unsuccessful, the IP BTS (CRS) (server) sends a MEASUREMENT INITIATION FAILURE message, that shall include the cause of this failure.

Figure 6B:
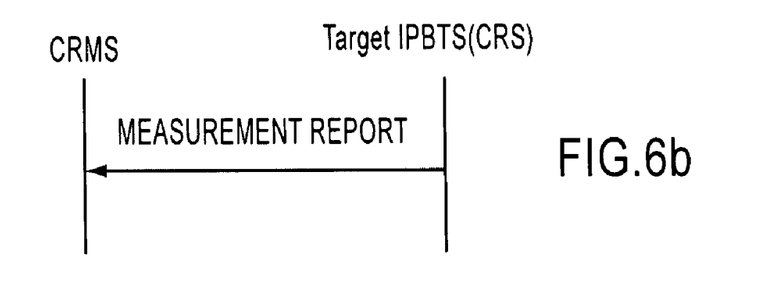

Measurement reporting will now be discussed with reference to FIG. 6b.

This procedure is used by the client (IP BTS (CRS)) to report the measurements requested by the CRMS in the Measurement Initiation procedure.

Figure 6C:
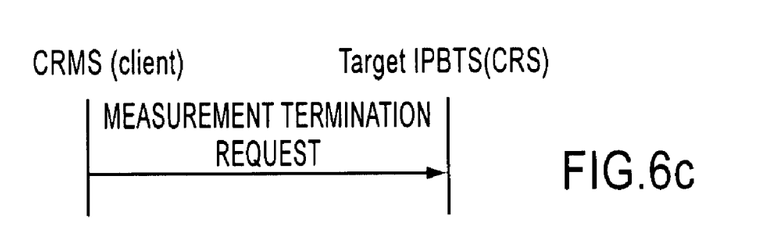

Measurement termination will now described with reference to FIG. 6c.

The CRMS (client) sends a MEASUREMENT TERMINATION REQUEST to one IP BTS (CRS) (server), indicating which measurement or group of measurement will be finished. No response is required for this procedure.

Figure 6D:
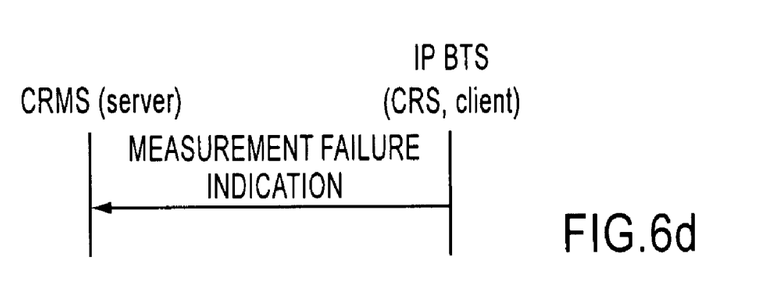

Measurement failure will now be described with reference to FIG. 6d.

A MEASUREMENT FAILURE INDICATION is sent by a IP BTS (CRS) (client) to inform that a previously requested measurement no longer can be reported. This message includes the cause of the failure.

Figure 6E:
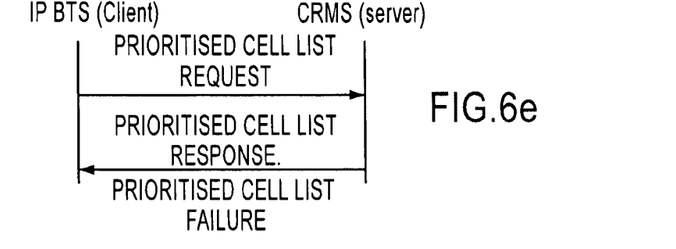

FIG. 6(e) illustrates measurement failure. A measurement failure indication is sent by a CRS to inform that a previously requested measurement no longer can be reported. This message includes the cause of the failure.

Using a new CRMS-UCF (user equipment control function) interface, the UCF sends to the CRMS (server) the list of candidate cells of a mobile station for a specific operation (handover, cell change order . . . ), including (if available) the mobile measurements for these cells and information about the quality of service that the user requires. The CRMS (server), after applying some algorithms, returns the prioritised list.

As shown in FIG. 6e the client (i.e. IP BTS internet protocol base transceiver station (UCF)) sends a PRIORITISED CELL LIST REQUEST message, including as parameters the candidate cell list, the mobile measurements for these cells, information about the mobile station classmark, and the quality of service parameters required by the user for the operation. If the prioritization is successfully completed by the CRMS (server), it sends a PRIORITISED CELL LIST RESPONSE message, which includes the reordered candidate cell list. In case of an unsuccessful operation, the CRMS shall send a PRIORITISED CELL LIST FAILURE message, with the cause of the failure (CRMS error, cell load measurement not available or the like . . . ).

In case that the PRIORITISED CELL LIST RESPONSE message is not received, or the PRIORITISED CELL LIST FAILURE message is received, it is assumed that the client will take the handover decision based only on the MS measurements. If the PRIORITISED CELL LIST RESPONSE arrives correctly, the client shall take this message as a command, and attempt to handover to the first candidate cell of the prioritised list if this fails, the client will try with the second candidate cell from the list and so on.

The OMS (operation and management server)-CRMS interface is the interface between CRMS (client) and O&M server. It has two different functions. Firstly to allow the client to change the parameters in network elements (e.g. Node B, RNC) by requesting these changes to O&M server. This is a more controlled way than changing the parameters directly in the networks elements. Secondly to allow the client to read the configuration management parameters.

Two elementary procedures are defined for this interface, as described below.

Figure 6F:
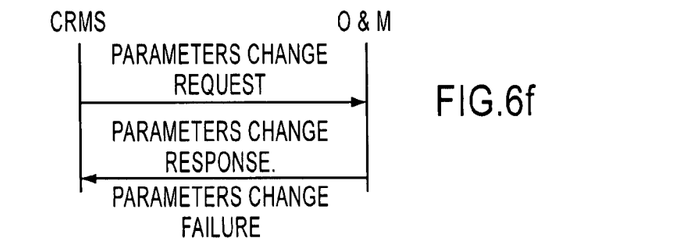

FIG. 6(f) illustrates a parameter change. The client sends a parameter change request to the parameter server. It includes the identification of the entity which parameters are going to be changed, and the new parameters values. As a result, if the change of the parameter values is correctly done, the parameter server will respond with a parameters change response message. On the other hand, if the operation is unsuccessful, the parameter server sends a parameters change failure message, including the cause of the failure (e.g. parameters not available, bad parameter value, change not allowed).

Figure 6G:
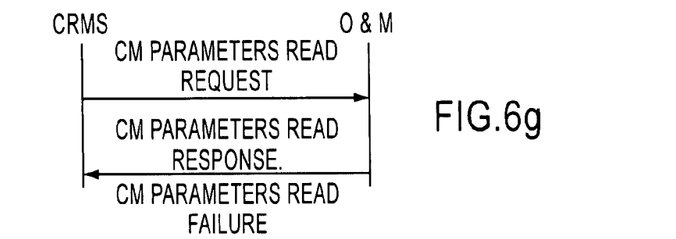

FIG. 6(g) illustrates a configuration management parameters read. The client sends a CM (configuration management) parameters read request message, which includes the list of parameters to be read. If the operation is successful, the parameter server responds with a CM parameters read response, including the parameters requested by the client. On the other hand, if the operation is unsuccessful, the Parameter server will send a CM parameters read failure message, containing the cause of the failure.

The DFCA method will now be described in more detail. DFCA is a channel assignment scheme for CSW circuit switched traffic which uses mobile downlink measurement reports and interference estimations for both downlink and uplink to dynamically assign a timeslot and frequency in the establishment of a new call. The criteria for this channel selection is to provide enough quality in terms of carrier to interference (C/I), so every connection will meet its quality of service requirements, reducing the interference caused to other connections. This leads to significant capacity gain as the usage of the valuable frequency resources is dynamically optimised. DFCA is a automated functionality that removes the need to make a frequency plan for those transceivers working with this new functionality.

The effect of this feature to the C/I distribution is similar as with other capacity enhancement features such as power control, frequency hopping and IUO intelligent underlay overlay. The connection level C/I control ensures that a high proportion of the connections are within a desired C/I window.

In order to achieve this, a timeslot (TSL) level of synchronisation is required. In other words, all the time slots of the different base stations start and end at the same time.

This TSL level of synchronisation for the base stations allows the BSC to get knowledge of the interference sources when a new channel assignment is to be performed so combining this information with the timeslot and frequency usage allows an improved channel selection. The information related to the potential interference situation expected for a certain connection comes mainly from mobile download measurement reports (provided every 480 ms). However, due to the limited information contained in the actual measurements provided by the mobile stations (just the six strongest neighbours are reported) for this purpose some statistical estimation of the interference situation must be implemented. This may be done by means of a Background Interference Matrix (BIM), so every cell of the network considered as a DFCA cell would have this information structure in order to estimate the impact in terms of interference caused by other DFCA cells both in the downlink and uplink directions.

Base station controller to base station controller interconnection is preferable for DFCA interconnection.

In some embodiments of the invention DFCA can be used with other existing features like power control and frequency hopping. In the case of frequency hopping only the cyclic mode will be implemented for DFCA, so it brings the frequency gain.

The advantages of DFCA are: quality of service control enhancement—handling different CSW traffic classes (voice, HSCSD high speed circuit switched data) and providing means to differentiate between users; operational costs are reduced if DFCA is operating on more transceivers as less frequency planning is required to set up the network.

There now follows a more detailed description with reference to FIG. 7 of how one or more of the above described embodiments may be implemented.

The BSC-BSC interface is used for the transmission of BSC or BTS measurements to neighbouring BSCs, for example the channel allocation matrix BIM for DFCA.

As mentioned previously, DFCA is a way to allocate and control the air interface resources used for each connection based on the type of service required, so that the required quality of service is delivered and no resources are wasted delivering excess quality to users and services that do not need it. The radio resource management system maintains a matrix of the link quality of all the possible timeslots and frequencies where each connection request can be allocated. This matrix gives a choice of possible C/I rations that can be allocated. The algorithm searches for a pair (timeslot, frequency) for which the required C/I level fits with the quality required.

The BSC-BSC connection is required in order to exchange the information need by the DFCA so the main potential gains associated to a synchronized system can be achieved. All the Channel Allocation features that can be potentially built over Synchronized GSM networks will be based on the calculation of the C/I values associated with different combinations of timeslot and frequency. In order to accurately perform such calculation it is required to have access to the traffic distribution and power control information of existing connections in interfering cells. This information will permit the system to control the C/I of each connection, efficiently distributing the interference and achieving the highest spectral efficiency.

The interference cells may be controlled by the serving cell BSC or a neighbouring BSC. Therefore a mechanism to access the relevant information from neighbours BSCs is to be implemented. This interface is compatible with the CRS-CRS interface in IP-RAN architecture described above. In preferred embodiments of the invention, the BSC to BSC interface has the same or similar elementary procedures as the CRS to CRS interface.

There are two possible options for the implementation of this interface.

A) Point-to-point addressing (UNICAST)
  In this case, one measurement message is generated for each of the neighbour BSCs that receive the message.
B) Multicast addressing (MULTICAST)
  It is possible to use multicast addressing, so that if one BSC has to send the same measurement to several neighbouring BSCs, just one message is sent to a multicast address, and the transport network shall deliver one copy of the message to all the recipients.

The same elementary procedures can be specified for both options. The only difference will be some of the contents of the messages.

The transport layer shall also provide some mechanisms in order to detect if the link between two BSCs is not working, and inform an upper layer of this situation.

Four procedures are specified for this interface. The first procedure establishes a new measurement relation between one source cell in the source BSC and one target cell in the target BSC. The Measurement Relation Initiation procedure also starts the sending/exchange of measurements between the source BSC and the target BSC related to the source and target cell respectively. The Relation type information element IE indicates the type of relation. The type of measurements to be exchanged shall depend on this Relation type IE (for example, in the specific case of the DFCA relationship, one measurement relation shall be established when the target cell appears in the BIM matrix of the source cell. The measurements exchanged in this case are: "channel assignment/release" in the source cell, "channel assignment/release" in the target cell, "BIM update" from the source cell to the target cell and "cell information change").

The measurement relationship is defined just in one way; therefore the relation source cell-target cell is different of the target cell-source cell.

A MEASUREMENT RELATION INITIATION REQUEST message is sent from the source BSC to the target BSC when measurements between source and target BSCs related to source and target cells respectively must be sent/exchanged (in case of the DFCA measurements, when a cell of the source BSC detects a new entry in the BIM of a cell of an external BSC). The purpose of this message is the establishment of the measurement relation between those two cells.

The MEASUREMENT RELATION INITIATION REQUEST shall include the identification of the source cell (DFCA: the cell where the entry has appeared), the identification of the target cell (DFCA: the cell that has appeared in the BIM) and Relation Type IE, that indicates the kind of measurements to be exchanged. This message includes also the list of measurements related to the source cell that the source BSC supports, including the report characteristics and, in case of measurements sent using multicast addressing, the multicast IP address.

If the operation is successful, the target BSC shall generate a MEASUREMENT RELATION INITIATION RESPONSE message. This MEASUREMENT RELATION INITIATION RESPONSE message also tells the source BSC the parameters needed to receive measurements from the target BSC related to the target cell, as defined in the Relation Type IE.

After the reception of the MEASUREMENT RELATION INITIATION RESPONSE message, begins the exchange of measurements (Measurement Report procedure) between the source BSC and the target BSC related to the source and target cell respectively.

If the multicast option is used, the MEASUREMENT RELATION INITIATION REQUEST message shall include the source cell multicast transport address, so that the target BSC can use it to receive the measurements related to the source cell of the source BSC.

If the multicast option is used, the MEASUREMENT RELATION INITIATION RESPONSE message shall include the target cell multicast transport address, so that the source BSC can use it to receive the measurements related to the target cell of the target BSC.

The report characteristic IE is used to inform the source/target BSC about the kind of reporting by which the measurements are going to be sent.

In case of one specific measurement defined in the Measurement Type IE, the event-X option can be used by defining the specific threshold values. In case of a group of measurements defined in the Measurement Type IE, the event-X options shall be used only for to one specific parameter. In case where no specific parameter defined, the event-C option can be used, with the increase/decrease threshold set to 0, indicating that the measurements shall be reported each time that there is a change in the status of the group of measurements defined in the Measurement Type IE. (For example, if the Measurement Type IE is set to "Channel Assignment/Release": the Report Characteristics IE is set to "Event-C", and the increase/decrease threshold is set to 0, indicating that the channels assigned/released are sent every time there is a channel assignment/channel release).

In case of DFCA measurements, the MEASUREMENT RELATION INITIATION REQUEST message (corresponding to the first BIM update message is sent to all the BSCs that belongs to the location area of the target cell. So, the BSCs which do not own the target cell that received the MEASUREMENT RELATION INITIATION REQUEST message will ignore this request, and only the BSC owner of the cell shall generate the MEASUREMENT RELATION INITIATION RESPONSE/FAILURE message.

Figure 7A:
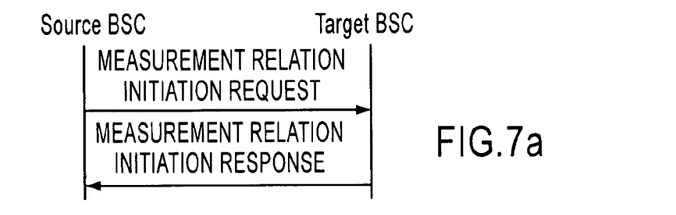
FIG. 7(a) to (d) show a method of communication between a source and a target.
Figure 7B:
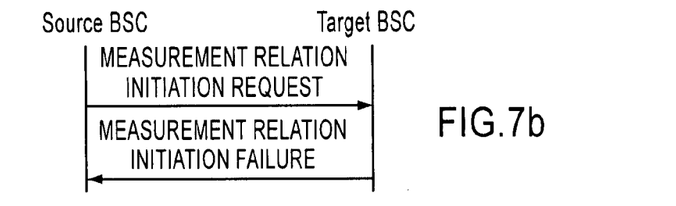

Reference will now be made to FIG. 7B. If the requested measurement relation cannot be initiated, the target BSC shall send a MEASUREMENT RELATION INITIATION FAILURE message, which shall include the cause of this failure.

Typical cause values are as follows:
Measurement not supported for the object; or
DFCA not supported for the cell.

Figure 7C:
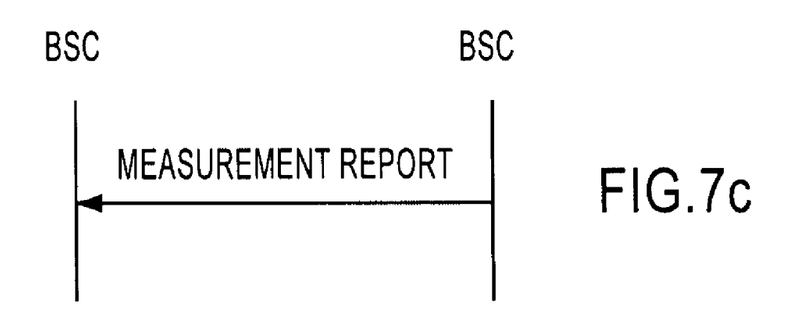

Reference is made to FIG. 7C which shows the procedure used by a BSC to report the result of measurements requested by the relation created in the measurement relation initiation procedure. In the DFCA case, the measurements requested are those related to the channel status of the source and target cells of the relation, the BIM update measurements of the source cell and the cell information change.

This procedure is used by the BSC to multicast/report the measurement related to one cell to the other BSCs that requested the measurements.

If the Measurement Type IE is set to "Channel Assignment/Release", one MEASUREMENT REPORT message shall be generated from each of the BSC every time there is a channel assignment or channel release in a cell involved in one relation. This message shall be sent to all the source BSCs that have cells with established relations with this cell. Even if there are more than one relation between the target cell and cells from one BSC, only one MEASUREMENT REPORT message shall be sent to the source BSC.

If the Measurement Type IE is set to "BIM update", one MEASUREMENT REPORT message shall be generated from the source BSC to the target BSC that contains the target cell each time there is a change in the interference value on the BIM matrix. This message is sent using unicast addressing, and contains the new C/I value measured in the source cell for the target cell.

If the Measurement Type IE is set to "Cell Information Change", one MEASUREMENT REPORT message shall be generated from the source BSC to the target BSC to indicate that the BCCH or the BSIC of the source cell has been changed by the operator.

Figure 7D:
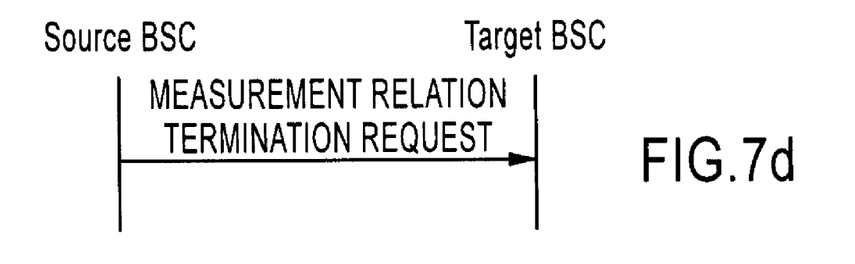

Reference is made to FIG. 7D which shows the procedure used by one BSC to terminate a measurement relation previously requested by the Measurement Relation Initiation procedure.

The source BSC shall send a MEASUREMENT RELATION TERMINATION REQUEST to the target BSC, indicating that the relation identified by the Relation Id IE shall be terminated due to some cause. Upon reception, the target BSC shall terminate the relation established between the source cell and the target cell. No response is required for this procedure.

The termination of the measurement relation also implies (in case there is no relation in the way target cell-source cell) the termination of the measurement process between the source cell and the target cell.

A DFCA relation initiation request will generally include the following information: message type; transaction identity; base station controller identity; the BSIC for the interfered cell; the BCCH for the interfered cell; the BSIC for the interfering cell; the BCCH for the interfering cell; the BIM C/I value; the measurement type that is supported in the source cell; the report characteristics that is supported in the source cell and if multicast addressing is supported, the class D address of the source cell is given. The DFCA relation initiation response may include similar information as in the DFCA relation initiation request. However, the measurement type and report characteristics will be those that are supported by the target cell rather than the source cell. The multicast IP address will be that of the target cell.

If the DFCA relation initiation failure is the response, then this will include the message type; the transaction identity; the interfered cell identity; the BSIC for the interfered cell; the BCCH for the interfered cell; the identity of the interfering cell; the BSIC of the interfering cell; the BCCH of the interfering cell; and the cause of the failure.

The BIM update message includes the following bits of information; message type; transaction identity; the interfered and interfering cell identities, BSIC and BCCH; and the BIM C/I value.

The measurement report message will include the following: message type; transaction identity; the BSIC and BCCH of the cell; the measurement type supported in the cell; channel assignment/release measurements; channel operation; channel information; channel type; subchannel; timeslot of the connection; identity of the transmitter; the mobile allocation MA-list ID normalised MAIO]; training sequence code; power control information; and minimum channel carrier to interference required. At least some of these bits of information may be optional.

The DFCA relation termination request may include the following: message type; transaction identity; interfered cell and interfering cell identities and their BSIC and BCCH.

The transaction identity is used to associate all the messages belonging to the same procedure. Messages belonging to the same procedure shall use the same transaction identity.

The measurement type identifies which kind of measurement shall be performed. The channel operation indicates that the operation included is a channel assignment or a channel release. The report characteristics indicate how the reporting of the measurement shall be performed. For example, the reporting can be done on demand, periodically in which case the period is specified or in response to the occurrence of an event, the parameters of the event being set. The event may be in response to a particular measurement threshold being attained. Different events may have different thresholds.

It should be appreciated that those embodiments of the invention which do not use the DFCA procedure may contain similar information in their messages as with the DFCA procedure.

It should be appreciated that the network of FIG. 5 can be used in systems where there is more than one network. The other networks may be of the type shown in FIG. 4. In that case, the base stations of the network shown in FIG. 5 would be connected to the base station controllers of a GSM network or the radio network controllers of a CDMA network.

It should be appreciated that the modification of the first embodiment shown in FIG. 3 can be used with the second or third embodiments.

It should be appreciated that embodiments of the invention are applicable to GSM base station controllers or any similar entity in any other type of network, for example a cell resource server in an IPR radio access network. Embodiments of the present invention have been described in the context of DFCA algorithm. However, embodiments of the present invention can be used in any situation where exchange of information about neighbour cells are required. The embodiment described hereinbefore proposes a mechanism for exchanging information relating to cells belonging to different cell controllers or base station controllers. The mechanism described can use IP multicast services.

The requirement for measurements from the target cell in the source cell can be triggered by any appropriate event such as mobile station measurements, operator configuration or the like. In the case of DFCA, the channel assigned or released in the target cell are needed in the source base station controller when the mobile station measurements received indicate that the target cell is interfering with users in the source cell.

Where the multicast option is used, class D IP addresses are used. Thus, if one base station controller or the like wants to receive the measurements related to the external cell, it shall inform its local router that it wishes to receive transmissions addressed to the specific multi groups of that external cell. This subscription may be made using the internet group of management protocol IGMP. If the base station controller or the like wants to receive the measurements related to one external cell, it needs the IP multicast address of that external cell. The response message includes the multicast rP address of the target cell so that the source base station controller can initiate the subscription process in its local router. Also, the request address includes the multicast IP address of the source cell so that the target base station controller can also receive the measurements related to the source cell by making the same subscribing process.

With the multicast option, it is preferred that the local route supports the IGMP protocol.

In embodiments of the present invention, mobile stations have been described. It should be appreciated that the mobile stations can be replaced by any other suitable user equipment which may or may not be mobile.

The invention claimed is:

1. An apparatus, comprising:
   a receiver of a second area configured to receive channel allocation information in cells corresponding to a first plurality of base stations in a first area controlled by a first plurality of base station controllers of the first area, wherein the channel allocation information comprises at least one of channel status information or cell status information;
   a base station controller of the second area being configured to:
      control channel allocation in cells corresponding to a second plurality of base stations in the second area, wherein each cell in the first area is sufficiently close to a respective one of the cells in the second area to cause interference; and
      take into account the received channel allocation information in the cells in the first area when controlling channel allocation in the cells in the second area to limit interference;
      wherein the base station controller of the second area is further configured to take into account the received channel allocation information by selecting a channel assignment to establish a new call based on the received channel allocation information to reduce interference with connections corresponding to the received channel allocation information; and
   a co-ordinator to receive the channel allocation information from the first plurality of base station controllers of the first area; wherein the co-ordinator is provided in a network element separate from the first plurality of base station controllers or the base station controller of the second area.

2. The apparatus as claimed in claim 1, wherein the received channel allocation information corresponds to the cells in the first area adjacent to or overlapping with the cells in the second area.

3. The apparatus as claimed in claim 1, wherein the base station controller of the second area is configured to receive power control information from one of the plurality of base station controllers operating in the first area to reduce interference.

4. The apparatus as claimed in claim 1, wherein the base station controller of the second area is one of a second plurality of base station controllers, and wherein the base station controller of the second area is further configured for forwarding information which indicates whether the channel allocation information is to be sent to other ones of the second plurality of base station controllers of the second area.

5. The apparatus as claimed in claim 1, wherein the channel allocation information further comprises at least one of frequency information, a carrier to interference value associated with a timeslot and frequency combination, and traffic distribution.

6. The apparatus according to claim 5, wherein the cell information includes information to identify the cell, location area code (LAC), or call indicator (CI).

7. The apparatus according to claim 5, wherein the channel allocation information includes a state of time slots, including at least one of idle, reserved, half rate or full rate, a used down-link power control of a base station, or a used mobile allocation index offset.

8. The apparatus of claim 1, further comprising:
   wherein the channel allocation information is multi-cast.

9. The apparatus of claim 1, further comprising:
   wherein the base station controller of the second area is configured to continuously receive the channel allocation information.

10. The apparatus as claimed in claim 1, wherein the base station controller of the second area is configured to receive the channel allocation information when there is a change in the channel allocation information at one of the plurality of base station controllers of the first area.

11. The apparatus as claimed in claim 1, wherein the base station controller of the second area is configured to send a request to receive the channel allocation information.

12. The apparatus as claimed in claim 1, wherein the receiver of the second area receives the channel allocation information based on the plurality of base station controllers of the first area being provided with information identifying the base station controller of the second area as a neighbor.

13. The apparatus as claimed in claim 1, wherein the base station controller of the second area comprises one of a second plurality of base station controllers and the co-ordinator is configured to forward the channel allocation information to more than one of the first plurality of base station controllers and the second plurality of base station controllers.

14. The apparatus as claimed in claim 1, wherein the base station controller of the second area comprises one of a second plurality of base stations controllers and the co-ordinator is provided with forwarding information which defines to which of the first plurality of base station controllers and the second plurality of base station controllers the channel allocation information is to be forwarded.

15. The apparatus as claimed in claim 1, wherein the base station controller of the second area comprises one of a second plurality of base stations and the co-ordinator is configured to make channel allocation decisions for more than one of the first or second plurality of base station controllers taking into account the channel allocation information from at least one other of the first or second plurality of base station controllers.

16. The apparatus as claimed in claim 1, wherein the apparatus is operating in a cellular system.

17. The apparatus as claimed in claim 16, wherein the base station controller of the second area comprises a radio network controller.

18. The apparatus as claimed in claim 1, wherein at least one of the following is used by the base station controller of the second area to allocate a channel:
dynamic frequency allocation, dynamic channel allocation, or co-ordination of the use of high data rates.

19. The apparatus as claimed in claim 1, further comprising:
wherein the base station controller of the second area is one of a second plurality of base station controllers at least one of which is associated with one of a plurality of radio access networks and at least one other of the second plurality of base station controllers is associated with another of the plurality of radio access networks.

20. The apparatus as claimed in claim 1, wherein a first part of the first or second areas is a source and a second part of the first or second areas is a target.

21. The apparatus as claimed in claim 20, wherein one of the first plurality of base station controllers of the first area or the base station controller of the second area which is associated with the source is configured to detect a new entry in information relating to the target.

22. The apparatus as claimed in claim 20, wherein the base station of the second area comprises one of a second plurality of base station controllers and a message is sent from at least one of the first plurality of base station controllers or at least one of the second plurality of base station controllers which is associated with the source to the at least one of the first plurality of base station controllers or at least one of the second plurality of base station controllers which is associated with the target to initiate communication.

23. The apparatus as claimed in claim 22, wherein the message comprises one or more of the following pieces of information:
message type, transaction identity, identity of the source, information relating to parameters in the source and/or the target, information relating to a carrier to interference ratio, types of measurement supported in the source or the at least one base station controller associated with the source, report characteristics supported by the source or the at least one base station controller associated with the source, if multicast addressing is used the address of the source or the at least one base station controller associated with the source.

24. The apparatus as claimed in claim 23, wherein the at least one of the first plurality of base station controllers or the at least one of the second plurality of base station controllers associated with the target is configured to send a response to at least one of the first plurality of base station controllers or at least one of the second plurality of base station controllers associated with the source.

25. The apparatus as claimed in claim 24, wherein the response comprises one or more of the following bits of information: message type, transaction identity, identity of the target, information, relating to parameters in the source and/or the target, information relating to a carrier to interference ratio, types of measurement supported in the target or the at least one base station controller associated with the target, report characteristics supported by the target or the at least one base station controller associated with the target, if multicast addressing is used the address of the target or the at least one base station controller associated with the target.

26. The apparatus as claimed in claim 25, wherein the response, if the communication cannot be established, comprises a cause of failure.

27. The apparatus as claimed in claim 26, wherein if the communication is initially successfully established, an update message is sent from the at least one base station controller associated with the source to the at least one base station controller associated with the target providing information on the source.

28. The apparatus as claimed in claim 27, wherein the at least one base station controller associated with the target is configured to provide information relating to channels associated with the target.

29. The apparatus of claim 1, wherein the selecting of the channel assignment to establish the new call based on the received channel allocation information further comprises selecting to maintain a desired quality of service of each connection.

30. The apparatus of claim 1, wherein the selecting of the channel assignment to establish the new call based on the received channel allocation information further comprises selecting to control a carrier to interference value of each of the one or more connections to optimize a spectral efficiency of the one or more connections.

31. A method, comprising:
controlling, by a base station controller, channel allocation in cells corresponding to a first plurality of base stations in a first part of an area;
receiving channel allocation information in cells corresponding to a first plurality of base stations in a second part of the area controlled by a first plurality of base station controllers in the second part of the area, wherein each cell in the first area is sufficiently close to a respective one of the cells in the second area to cause interference, wherein the channel allocation information comprises at least one of channel status information or cell status information; and
taking into account the received channel allocation information when controlling channel allocation in the cells in the first part of the area to limit interference;
wherein taking into account the received channel allocation information further comprises selecting a channel assignment to establish a new call based on the received channel allocation information to reduce interference with connections corresponding to the received channel allocation information;
wherein the channel allocation information is received by a co-ordinator provided in a network element separate from the base station controller in the first part or the first plurality of base station controller in the second part.

32. The method of claim 31, further comprising:
wherein the received channel allocation information corresponds to the cells in the second part of the area adjacent to or overlapping with the cells in the first part of the area.

33. The method of claim 31, further comprising:
receiving, from one of the plurality of base station controllers, power control information associated with a respective one of the cells in the second part of the area to reduce interference.

34. The method of claim 31, wherein the receiving is based on forwarding information which indicates to which one or more other base station controllers the channel allocation information is to be sent.

35. The method of claim 31, wherein the channel allocation information further comprises at least one of frequency information, a carrier to interference value associated with a timeslot and frequency combination, and traffic distribution.

36. The method of claim 31, wherein the channel allocation information includes a state of time slots, including at least one of idle, reserved, half rate or full rate, a used down-link power control of a base station, or a used mobile allocation index offset.

37. The method of claim 31, wherein controlling the allocation of channels further comprises performing at least one of:

dynamic frequency allocation, dynamic channel allocation, or co-ordination of a use of high data rates.

38. The method of claim 31, wherein the selecting of the channel assignment to establish the new call based on the received channel allocation information further comprises selecting to maintain a desired quality of service of each connection.

39. The method of claim 31, wherein the selecting of the channel assignment to establish the new call based on the received channel allocation information further comprises selecting to control a carrier to interference value of each of the one or more connections to optimize a spectral efficiency of the one or more connections.

* * * * *